(12) United States Patent
Branigan et al.

(10) Patent No.: US 8,255,394 B2
(45) Date of Patent: Aug. 28, 2012

(54) APPARATUS, SYSTEM, AND METHOD FOR EFFICIENT CONTENT INDEXING OF STREAMING XML DOCUMENT CONTENT

(75) Inventors: James P. Branigan, Durham, NC (US); David P. Charboneau, Durham, NC (US); Simon K. Johnston, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/475,999

(22) Filed: Jun. 1, 2009

(65) Prior Publication Data

US 2010/0306273 A1 Dec. 2, 2010

(51) Int. Cl.
*G06F 17/30* (2006.01)
(52) U.S. Cl. .................................................. 707/726
(58) Field of Classification Search ........... 707/E17.123, 707/726
See application file for complete search history.

(56) References Cited

U.S. PATENT DOCUMENTS

| | | | | |
|---|---|---|---|---|
| 7,113,942 B2 * | 9/2006 | Levanoni et al. | ................... | 1/1 |
| 2004/0268244 A1 * | 12/2004 | Levanoni et al. | ............... | 715/514 |
| 2005/0228768 A1 * | 10/2005 | Thusoo et al. | ................... | 707/1 |
| 2005/0228791 A1 * | 10/2005 | Thusoo et al. | ................... | 707/6 |
| 2006/0053122 A1 * | 3/2006 | Korn et al. | ................... | 707/100 |
| 2008/0097959 A1 * | 4/2008 | Chen et al. | ........................ | 707/2 |

* cited by examiner

*Primary Examiner* — Tony Mahmoudi
*Assistant Examiner* — Muluemebet Gurmu
(74) *Attorney, Agent, or Firm* — Kunzler Needham Massey & Thorpe

(57) ABSTRACT

An apparatus, system, and method are disclosed for efficient content indexing of streaming XML document content. A forest generator generates an XML pattern forest from a set of structured index path expressions, the XML pattern forest includes trees and twigs generated from structured index path expressions uniquely associated with a namespace indicator for an XML node. The XML node is identified in a stream of at least one XML document. A comparison module compares the XML node to nodes of trees and twigs of the XML pattern forest. A determination module determines a match between the XML node and an index node in one of a tree and a twig of the XML pattern forest. The index node has a path from an ancestor node to the index node that matches the axis steps of at least one of the structured index path expressions. A storage module stores an index entry for the XML node in response to the determined match, the index entry includes a XML document identifier, an XML node name, a namespace indicator for the XML node, and XML node content.

20 Claims, 5 Drawing Sheets

APPARATUS, SYSTEM, AND METHOD FOR EFFICIENT CONTENT INDEXING OF STREAMING XML DOCUMENT CONTENT

BACKGROUND

1. Field of the Invention

This invention relates to content indexing of content in streaming XML documents within a stream of one or more XML documents.

2. Description of the Related Art

In processing XML or other forms of hierarchical data including SGML, JSON, and the like different areas of optimization are developing. The first is dividing up of Extensible Markup Language (XML) data in an XML document for storage and later retrieval in a conventional relational hierarchical such as XML databases, and/or hybrid database systems. In this area, optimization focuses on storing parts of the XML document to facilitate locating and retrieving the data of the XML document. The second area focuses on optimizing queries for XML data by re-writing the XML query and/or adjusting query execution plans such that the data requested is located and retrieved as efficiently as possible. A third area seeks to optimize how an entire XML document can be marked, tagged, or otherwise identified as having content that will merit future retrieval of the entire XML document. Operations in this third area may be referred to as subject indexing, tagging, cataloging, indexing, content indexing (as used herein), or search engine indexing of content in an XML document. Such operations are distinct from creation and maintenance of indexes in a database system.

Optimizations in relation to databases benefit from the ability to expend time and overhead processing and manipulating an XML document or XML data query once in exchange for optimization benefits over time due to the large collection of documents and high query request rates. In contrast, content indexing takes place during the update or storage of an XML document and so the impact of content indexing on performance should be minimal. Unfortunately, convention solutions in the area of content indexing have used XPATH processors that load the entire XML document into memory as a Document Object Model (DOM). This requires significant processing resources and delay waiting for the DOM instance to be generated. Furthermore, the set of XML documents that will be the subject of content indexing is unknown and thus conventional techniques are unpredictable. Typically, while the set of XML documents that will be the subject of content indexing is unknown it is known that the XML documents are generally very large often many tens of megabytes in size each. Consequently, the inefficient use of memory and processing resources of conventional content indexing solutions have prompted a search for more efficient solutions.

BRIEF SUMMARY

From the foregoing discussion, it should be apparent that a need exists for an apparatus, system, and method that optimally indexes XML document content. Beneficially, such an apparatus, computer program product, system, and method would efficiently use both processing resources as well a memory resources to index content of streaming hierarchical documents.

The present invention has been developed in response to the present state of the art and in particular, in response to the problems and needs in the art that have not yet been fully solved by currently available content indexing solutions.

Accordingly, the present invention has been developed to provide an apparatus, computer program product, system, and method for content indexing of streaming Extensible Markup Language (XML) document content that overcome many or all of the above-discussed shortcomings in the art.

The computer program product for content indexing of streaming XML document content is provided with a plurality of components and modules configured to functionally execute the necessary steps of efficient content indexing. These modules in the described embodiments include a scanner, an identification module, a forest generator, a comparison module, a determination module, and a storage module.

In one embodiment, the scanner is an optional component that scans a streaming XML document in a stream of XML documents. The streaming XML document is streamed in document order according to XML tree traversal protocol. In one embodiment, the identification module is an optional component that identifies an XML node of the streaming XML document. The XML node may include an XML document element node and/or an XML document element attribute node.

In one embodiment, the forest generator generates an XML pattern forest from a set of structured index path expressions. Each set of structured index path expressions is uniquely associated with a namespace indicator. Each structured index path expression includes a series of one or more steps, each step comprising an axis step and each step having a node test and no predicates. The XML pattern forest comprising at least one of a tree and a twig generated from one or more structured index path expressions uniquely associated with a namespace indicator for the XML node.

In certain embodiments, the forest generator includes a read module that reads the set of structured index path expressions from a repository. The set of structured index path expressions may be identified by way of the namespace indicator for the XML node.

In certain embodiments, the forest generator includes a skip module that ignores each structured index path expression having no descendent axis steps and each structured index path expression having a first axis step that is different from a root node of the streaming XML document. The forest generator may also include a twig generator that defines a new twig for each index path expression having a descendent-or-self axis for a first step, the new twig comprising nodes representing the index path expression. The forest generator may also include a tree generator configured to define a new tree for each index path expression having a first axis step different from a root of an existing tree in the XML pattern forest, the new tree comprising nodes representing the index path expression.

In one embodiment, the forest generator may also include a grafting module configured to identify an existing tree in the forest having a root node matching the first axis step of an index path expression and appending a branch of nodes to the existing tree. The branch of nodes corresponding to one or more axis steps of the index path expression that differ from nodes of the existing tree, the branch anchored at a node that matches a last matching axis step of the index path expression evaluated from left to right.

In one embodiment, the forest generator may also include a completion module that identifies a second streaming XML document in the stream of XML documents. The completion module discards the XML pattern forest in response to identifying the second streaming XML document.

In one embodiment, the comparison module compares the XML node to nodes of the XML pattern forest. In certain embodiments, the comparison module determines that the namespace indicator for the XML node is different from a previously identified namespace indicator and causes the forest generator to reference a second set of structured index path expressions. The second set of structured index path expressions may be identified by way of the namespace indicator, the forest generator may be further configured to modify the XML pattern forest to include at least one of a tree and a twig representative of the second set of structured index path expressions and the set of structured index path expressions. In one embodiment, the comparison module includes a pruning module configured to determine that the XML node is a root node for the streaming XML document, and remove one or more trees from the XML pattern forest having a root node that does not match the XML node.

In one embodiment, the determination module determines a match between the XML node and an index node in one of a tree and a twig of the XML pattern forest, the index node having a path from an ancestor node to the index node that matches the axis steps of at least one of the structured index path expressions for the namespace indicator.

In one embodiment, the storage module stores an index entry for the XML node in response to the determined match. The index entry comprises an XML document identifier, an XML node name, a namespace indicator for the XML node, and XML node content.

It should be noted that while the embodiments of the invention described herein refer to Extensible Markup Language (XML) nodes, XML data, streaming XML documents XML documents, and XML content. Certain embodiments of the present invention are not limited to handling XML structured documents, nodes, and or content. Specifically, those of skill in the art recognize that embodiments of the present invention may operate on other forms of streaming hierarchical data including, but not limited to Standard Generalized Markup Language (SGML), JavaScript Object Notation (JSON), Hypertext Markup Language (HTML), and the like.

A method, apparatus, and system are also provided for efficient content indexing of streaming XML document content each providing a plurality of components, modules, and operations to functionally execute the necessary steps of efficient XML content indexing. The method, apparatus, and system may also be configured to functionally perform the necessary steps as described above in relation to the computer program product. The computer program product may be embodied as part of a SAX parser or as an add-on to a SAX parser.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
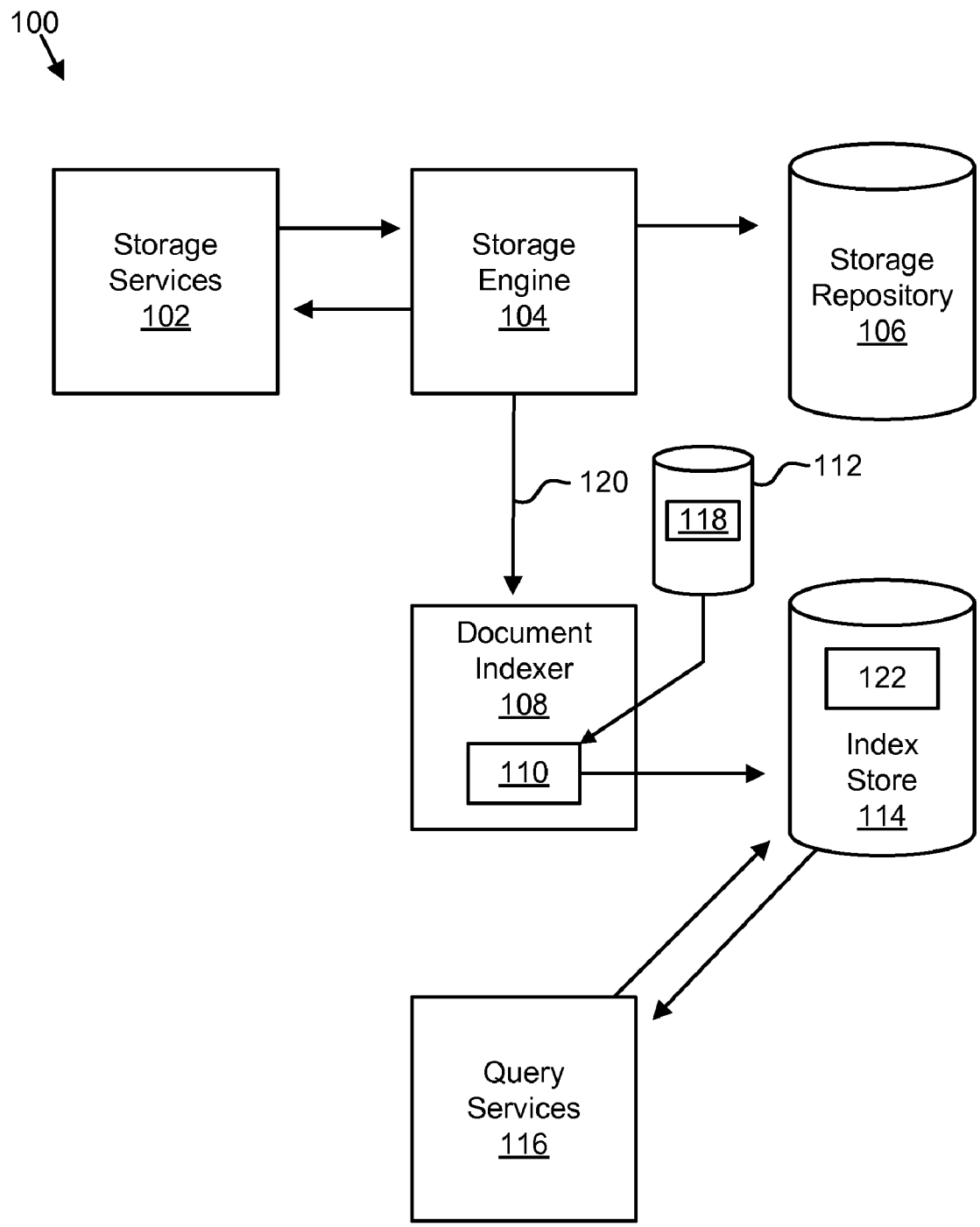
FIG. 1 is a schematic block diagram illustrating one embodiment of a system for efficient content indexing of streaming XML document content in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of storing machine-readable instructions on a digital processing apparatus. A computer readable medium may be embodied a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates one embodiment of a system 100 to for efficient content indexing of streaming XML document content. In general, the system 100 processes streaming XML documents in order to extract content that satisfies previously defined structured index path expressions. The system efficiently uses memory because each streaming XML document is processed dynamically, or on-the-fly, such that the document object model (DOM) is not created in memory. The system handles very large XML documents into streaming fashion. The system avoids constant reevaluation of the structured index path expressions. The system accepts and matches structured index path expression of starting axis that is a descendant or a descendent-or-self axis. In addition the system accepts structured index path expressions that include wild card steps.

The system 100 includes a storage services module 102, a storage engine 104, a storage repository 106, a document indexer 108, a content indexer 110, an expressions repository 112, an index store 114, and a query services module 116.

The storage services module 102 serves to store and retrieve XML documents from the storage repository 106. A hardware processor may execute the storage services module 102 within a computer readable storage medium. The storage services module 102 differs from a database in that the storage services module 102 stores the XML documents intact, meaning the structure of the XML document is preserved once the XML document is stored in the storage repository 106. Users or other clients may send XML documents to the storage services module 102 for storage and safe keeping. The storage services module 102 passes the XML documents to the storage engine 104 to store the XML document.

The storage engine 104 simply stores the XML document while preserving the structural metadata defining the XML document. In one embodiment, the storage engine 104 stores the XML document as a Large Binary Object (BLOB) data type. Alternatively, the storage engine 104 stores the XML document in native text format.

The storage repository 106 serves to store the XML document in such a manner that the entire XML document can be retrieved in response to a unique identifier associated with the XML document. In one embodiment, the unique identifier is a Uniform Resource Identifier (URI) such as a Uniform Resource Locator (URL). The URL may serve to identify where the associated XML document is stored in the storage repository 106. The storage repository 106 may be implemented using a file system, a web server, a database or the like. Those of skill in the art will recognize that while the storage repository 106, storage engine and storage services module 102 may be embodied by a database, such a database would not include or utilize the complex indexes and optimization functionality of such a database. Except to identify and stream new or updated XML documents to the document indexer 108.

In one embodiment, the storage engine 104 does not do any parsing or processing of the XML document unless the XML document is a new XML document that has not previously been stored in the repository 106 or is an XML document that updates a previously stored XML document. If the XML document is a new XML document or an update for an existing XML document, the storage engine 104 streams the XML document to the document indexer 108. In one embodiment, the storage engine 104 comprises a Simple API for XML (SAX) module that is a serial access parser Application Programming Interface (API) for XML. Advantageously, the SAX module parses the XML document and creates a stream of data nodes representative of the XML document. The document indexer 108 then listens for specific types of nodes as the SAX module streams the XML document.

The document indexer 108 serves to collect, parse and store data for fast retrieval from a structured, but undefined set of documents such as a set of XML documents, HMTL documents, or the like. A document indexer 108 may also be referred to as a web crawler, web indexer, a search engine indexer, and the like.

The document indexer 108 serves to identify nodes in an XML document that match previously defined structured index path expressions 118. In one embodiment, the structured index path expressions 118 are stored in an expression repository 112. In one embodiment, the expression repository 112 comprises a data structure such as a data file, a database, or the like and may be stored in persistent storage such as on a disk drive or other form of persistent data storage device. In certain embodiments, the expression repository 112 comprise a cache of efficient and fast memory that is loaded and updated as needed with structured index path expressions 118 from a more persistent memory storage device, or a combination of persistent and non-persistent memory devices.

As used herein, the term "structured index path expressions" refers to a pre-defined XML node and/or content value(s) including XML nodes content and XML attribute content that is to be identified and extracted from an arbitrary and unknown set of XML documents if that XML node and/or content value(s) occurs in the set of XML documents. Structured index path expressions 118 are described and explained in more detail in relation to FIG. 4. It should be noted that a structured index path expressions 118 differs from a database query because at the time the structured index path expressions 118 is defined the set of XML documents that may or may not include the XML node and/or content value(s) is arbitrary and unknown. While a database query may return no results, the structure of the database (its tables, indexes, and the like) are well defined and known before the query is formed.

Because the size of XML documents and number of XML documents in the set of XML documents that the document indexer 108 processes is unknown, the document indexer 108 preferably uses a minimal amount of memory and processes each XML document as quickly as possible. To satisfy these constraints, the document indexer 108 operates on a stream 120 of one or more XML documents. The document indexer 108 sends this stream 120 of XML documents to a content indexer 110. The content indexer 110 listens for particular types of data to pass by in the stream of XML documents. When a particular type of data as indicated by the content indexer 110 comes along in the stream 120, the document indexer 108 signals the content indexer 110. All other data in the stream 120 that is not of interest to the content indexer 110 simply passes through the stream 120 and is ignored by the content indexer 110. In this manner, a minimal amount of memory is used and the XML documents can be of any size and the stream can have an unlimited number of XML documents without impacting the performance of the document indexer 108.

The content indexer 110 seeks to match content and/or document structure in the XML stream 120 with one or more structured index path expressions 118. If a match is found, the content indexer 110 stores an index entry 122 in the index store 114. The match provides an indicator that the content described in the matching structured index path expressions 118 can be found in the XML document that included a data node that satisfied the structured index path expressions 118. The content indexer 110 the watches for particular types of data to occur in the stream of XML documents. In one embodiment, the content indexer 110 watches for XML nodes that are one of XML document element nodes and/or XML document element attribute nodes.

The index entry 122 serves to identify the XML document that matched an existing structured index path expression 118. The form and structure of the index entry 122 may vary so long as the index entry 122 includes a unique identifier of the corresponding XML document. In one embodiment, the index entry 122 comprises an XML document identifier, an XML node name for the XML node that satisfied a structured index path expression 118, a namespace indicator for the XML node and the content or value contained within the XML node. The unique identifier for the corresponding XML document may comprise a single element of the index entry 122 or a composite of multiple elements of the index entry 122.

In one embodiment, the index store 114 comprises a data structure such as a data file, a database, or the like and may be stored in persistent storage such as on a disk drive or other form of persistent data storage device. The index store 114 interfaces with the query services module 116.

The query services module 116 accepts queries from a user or client for index entries 122 that satisfy the query. The query services module 116 searches the index store 114 for one or more index entries 122 that match the provided query. If a match is found, in one embodiment, the matching index entries 122 are returned. In an alternative, embodiment, a unique XML document identifier is returned for each matching index entry 122. The client or user may then use the unique XML document identifier to retrieve the corresponding XML document if desired. For example, the user/client may send a request for a corresponding XML document to the storage services module 102. In this manner, the system 100 provides a very efficient and fast indexing system for a set of XML documents having an undefined number of XML documents and undefined size of each XML document based on structured index path expressions 118.

Figure 2:
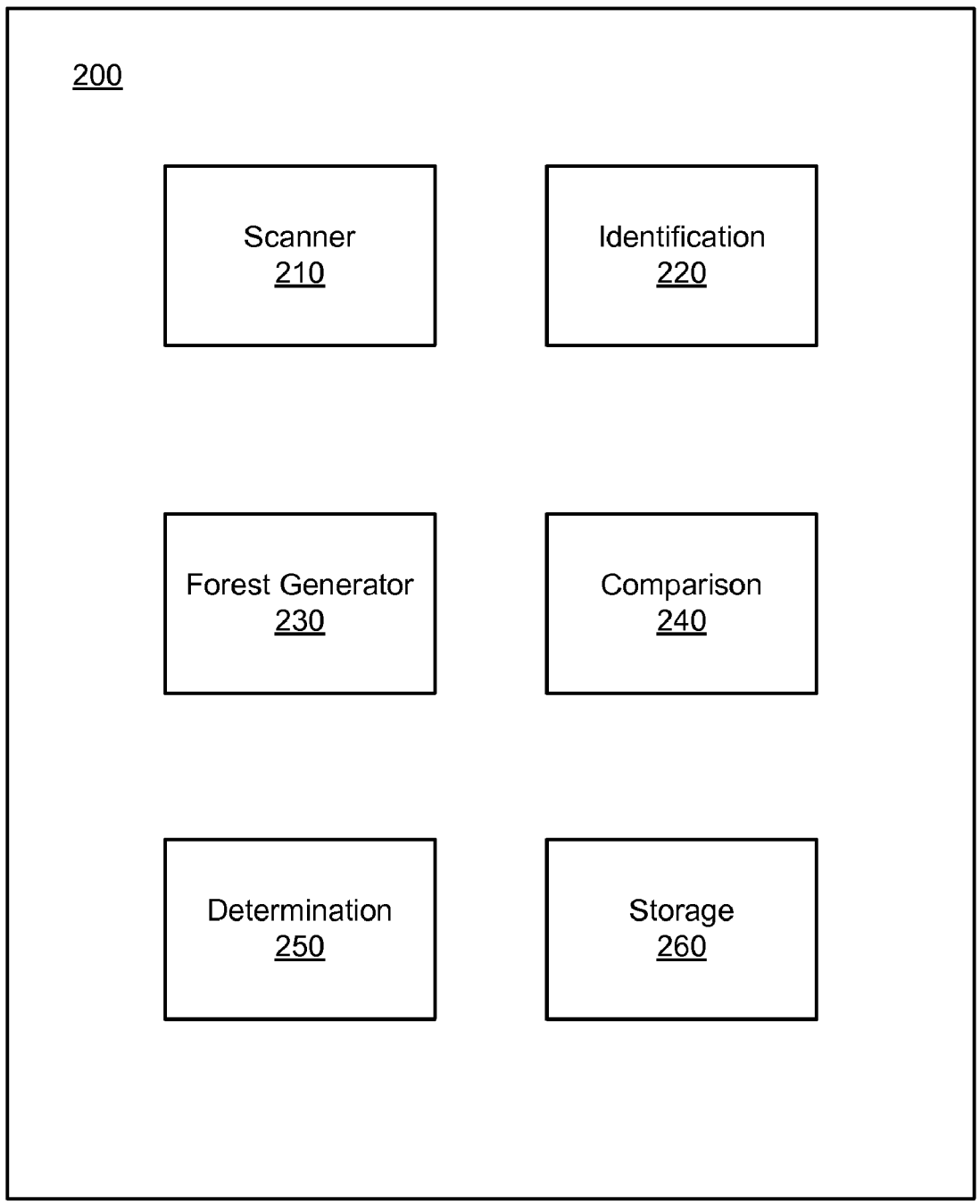
FIG. 2 is a schematic block diagram illustrating one embodiment of an apparatus for efficient content indexing of streaming XML document content in accordance with the present invention.

FIG. 2 illustrates an apparatus 200 for efficient content indexing of streaming XML document content. In one embodiment, the apparatus 200 serves as the content indexer 110 described in relation to FIG. 1. The Apparatus 200 includes a scanner 210, an identification module 220, a forest generator 230, a comparison module 240, a determination module 250, and a storage module 260.

The scanner 210 serves as an optional component that may be included in certain embodiments and may not be included in other embodiments. The scanner 210 scans a streaming XML document in a stream 120 of XML documents. The streaming XML document flows through the stream in document order in accordance with the XML tree traversal protocol. An XML document is a hierarchical structure that includes a root node at the top and zero or more levels of children of the root node. Each node in the XML document may include child nodes.

Document order in the XML tree traversal protocol means that the root node is first in the order, each node is processed before all of its children and descendants, attribute nodes immediately follow the element node they are associated with, sibling nodes are ordered in the order in which they occur in a children property of their parent node, and children and descendants occur before following sibling nodes. Streaming the XML document in document order permits the apparatus 200 to implement efficiency improvements because the order of each XML document is set.

The identification module 220 serves as an optional component that may be included in certain embodiments and may not be included in other embodiments. The identification module 220 identifies an XML node of the streaming XML document that may include content that matches one or more of the structured index path expression 118. In a particular embodiment, the identification module 220 identifies XML nodes that have a type of either XML document element node or XML document element attribute node. As is known in the art, XML documents may include a variety of types of XML nodes including comment nodes, text nodes, namespace nodes, and processing instructions nodes. By identifying just XML document element nodes and. or XML document element attribute nodes, the identification module 220 ignores the other XML node types which improves the efficiency of the apparatus 200.

In one embodiment, the identification module 220 is integrated with or operates in conjunction with a SAX parser. The identification module 220 may register one or more XML node types for the SAX parser to watch for in the XML document stream. Once the SAX parser locates an XML node of the type registered, the SAX parser may signal the identification module 220 which may optionally then signal the forest generator 230 and/or the comparison module 240.

The forest generator 230 generates an XML pattern forest from a set of structured index path expressions 118. The XML pattern forest facilitates matching of structured index path expressions 118 to XML nodes in the streaming XML document while minimizing or eliminating the need to evaluate and/or reevaluate the structured index path expressions 118 as each XML node i located. The XML pattern forest is a data structure having zero or more hierarchical tree structures and zero or more hierarchical twigs. The XML pattern forest generates a twig and/or a tree for each structured index path expressions 118 in a set of structured index path expressions 118. Each member of the set of structured index path expressions 118 is associated with a namespace by a unique namespace indicator. Each XML node in the streamed XML document is associated with a namespace indicator. An XML pattern forest is described in more detail below in relation to FIGS. 3 and 4.

The comparison module 240 compares the XML node identified by the identification module 220 to nodes within the XML pattern forest. In certain embodiments, the comparison module 240 tracks where the XML node partially matches a tree of the XML pattern forest as the XML document passes by in the stream. By tracking the partial matches within one or more trees and/or one or more twigs of the forest, the comparison module 240 maintains a context for determining whether the particular XML node in the stream 120 may match one or more of the structured index path expressions 118.

The determination module 250 determines a match between the XML node and an index node in either a tree and/or a twig of the XML pattern forest. In one embodiment, the determination module 250 examines the current XML node and nodes of one or more of the trees and/or twigs of the XML pattern forest in order to determine that the XML node matches an index node of either a tree and/or a twig of the XML pattern forest. An index node is a node of a tree or a twig of that XML pattern forest that has a path from an ancestor node in the tree or twig to the index node that matches the axis steps of at least one of the structured index path expressions 118 for a specific namespace identified by a unique namespace indicator. Each node of the at least one tree and/or at least one twig is associated with a unique namespace indicator. Each tree may comprise index nodes from a plurality of namespaces.

The storage module 260 stores an index entry 122 built from the XML node in response to the determination module 250 finding a match between the XML node and at least one index node of the XML pattern forest. In one embodiment, the index entry 122 comprises an XML document identifier such as a URL or URI, an XML node name for the XML node, a namespace indicator for the XML node and the content or value contained within the XML node. Alternatively, the index entry may include just the XML document identifier so long as the XML document identifier uniquely identifies the XML document. In another embodiment, the index entry 122 comprises an XML document identifier, composite field of the XML node name and the namespace indicator for the XML node, and the content or value contained within the XML node.

Figure 3:
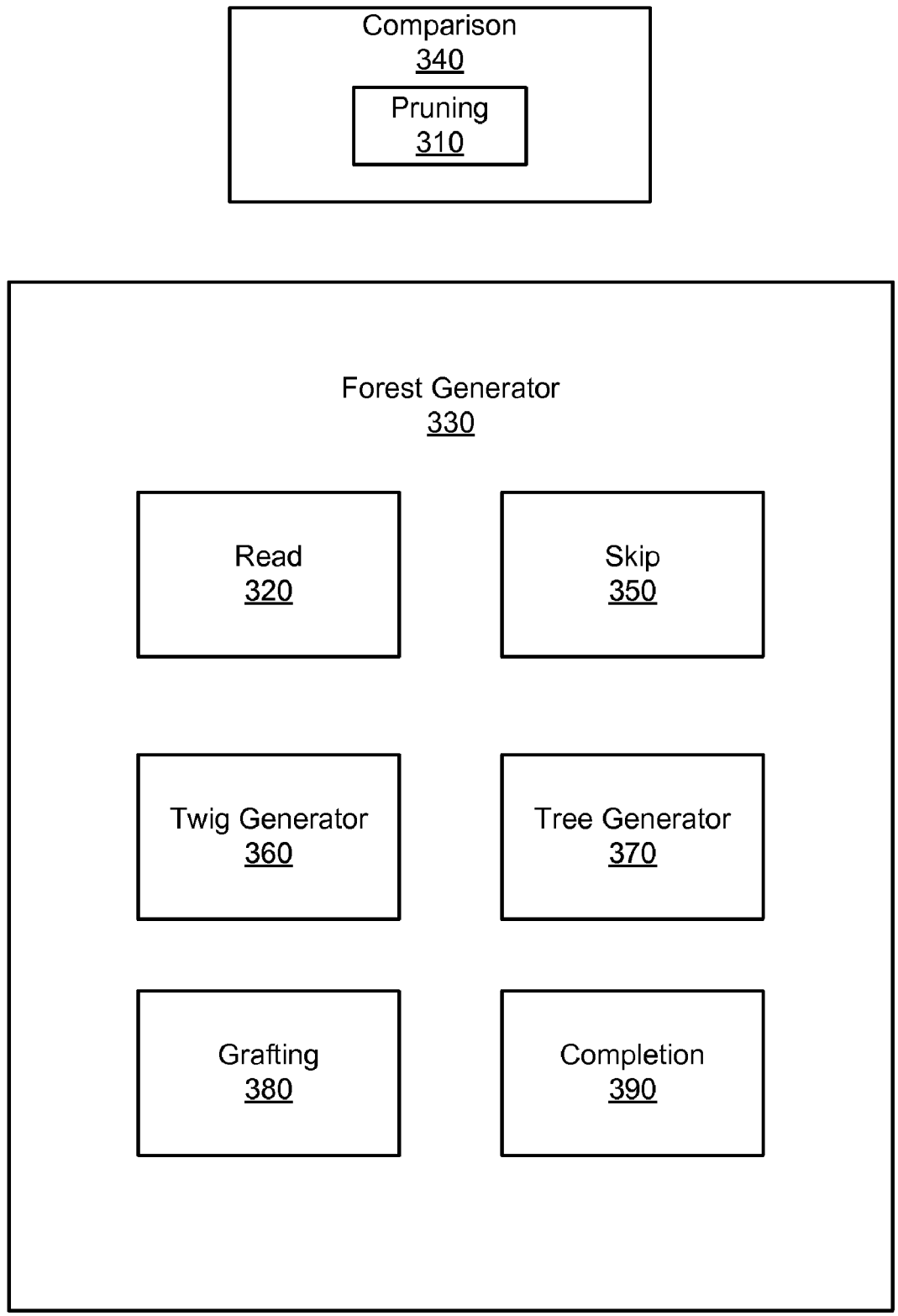
FIG. 3 is a schematic block diagram illustrating one embodiment of a comparison module and a forest generator for efficient content indexing of streaming XML document content in accordance with the present invention.

FIG. 3 illustrates one embodiment of a comparison module 340 in accordance with one embodiment of the present invention. Advantageously, the present invention is configured to index content in streaming XML documents in which the XML documents include XML nodes associated with two or more different namespaces. Consequently, the present invention is configured to keep track of the different namespaces associated with the XML nodes in a streaming XML document.

For example, in one embodiment, the comparison module 240 may maintain a listing of each unique namespace for the XML nodes that are compared in a given XML document. The comparison module 340 may determine whether the namespace indicator of an XML node currently being compared includes a namespace indicator that is different from a previously identified namespace indicator. If the XML node includes a namespace indicator that has not yet been previously identified for this XML document, the comparison module may signal the forest generator 230 to reference a second set of structured index path expressions 118.

This second set of structured index path expressions 118 is uniquely associated with the namespace indicator that has not previously been identified for this XML document. In response to the signal from the comparison module 340, the forest generator 230/330 may modify the XML pattern forest to include at least one of a tree and/or a twig that represents the second set of structured index path expressions 118. In this manner, the XML pattern forest now represents the structured index path expressions 118 for each previously identified namespace indicator as well as for the namespace indicator of the XML node currently being compared.

In addition or alternatively, the comparison module 340 may include a pruning module 310. The comparison module 340 may activate the pruning module 310 if the present invention has previously identified the root node of the streaming XML document. If the root node is not the same as the current XML node being compared, then any tree in the XML pattern forest having a root node that is not the same as the root node of the streaming XML document will never match any other XML node in the streaming XML document.

Consequently, in certain embodiments, in order to further increase efficiency, the pruning module 310 may delete or remove each tree in the XML pattern forest having a root node that is different from the root node for the streaming XML document. Removing the trees that will never match descendent of XML nodes of the current streaming XML document reduces the number of nodes the comparison module must search for subsequent XML nodes of the streaming XML document.

FIG. 3 illustrates one embodiment of a forest generator 330 in accordance with one embodiment of the present invention. The forest generator 330 includes a read module 320, a skip module 350, a twig generator 360, tree generator 370, in drafting module 380, and a completion module 390.

The read module 320 reads a set of structured index path expressions 118 from a repository. In one embodiment, the repository is a structured index path expression repository 112. Alternatively, the structured index path expression repository is a dedicated portion of non-persistent memory, a file data structure, a cache, or the like. The set of index path expressions 118 are uniquely associated with a particular namespace. That namespace is represented by a specific namespace indicator. In certain embodiments, the forest generator 330 activates the read module 320 to reference or read a set of structured index path expressions 118 for each namespace indicator. As noted above, each XML node may be associated with a different namespace as defined by its namespace indicator. Associating each set of structured index path expressions 118 with a particular namespace indicator provides flexibility in defining structured index path expressions 118 since a set of particular structured index path expressions 118 can be defined for each namespace indicator.

The skip module 350 identifies structured index path expressions 118 that should not be added to the XML pattern forest. Typically, the index path expressions 118 that should not be added are those which had no further information beyond what is already represented. Or, the index path expressions 118 represent a match that not possible with the current a streaming XML document. In one embodiment, the skip module 350 ignores each index path expression 118 that has no descendent axis steps. In addition, the skip module 350 eight north each index path expression 118 having a first axis step that is different from a root node of the current streaming XML document. As used herein the term "skip" and "ignore" refer to the act of reviewing and the index path expression 118 and determining to make no additions to the XML pattern forest to represent that index path expression 118.

The twig generator 360 defines a new twig in the XML pattern forest for each index path expression 118 that includes a descendant-or-self axis for a first step. A descendant-or-self axis is typically represented by the abbreviation "//". A twig is a special form of a hierarchical structure. The twig does not include a particular root node limitation. Instead, a branch of a hierarchical structure can match the twig so long as each step of the branch matches each descendent node of the twig below the descendant-or-self axis. Twigs are described in more detail in relation to FIG. 4.

The tree generator 370 defines a new tree in the XML pattern forest for each index path expression 118 that includes a first axis step different from a root node of an existing tree in the XML pattern forest. A tree is a hierarchical structure having a root node and descendent nodes that follow the similar structural limitations to an XML document. Trees are described in more detail in relation to FIG. 4.

The grafting module 380 identifies an existing tree in the forest having a root node matching the first axis step of an index path expression 118. The grafting module 380 evaluates the index path expression 118 from left to right. The grafting module 380 appends a branch of nodes representing the index path expression 118 to the existing tree. Each node of the branch corresponds to an axis step of the index path expression that differ from nodes already present in the existing tree. The branch is anchored, or connected to the existing tree at a node that matches a last matching axis step of the index path expression 118 when the index path expression 118 is evaluated from left to right.

The read module 320, skip module 350, twig generator 360, tree generator 370, and grafting module 380 cooperate to augment or shrink the XML pattern forest as XML nodes of a streaming XML document are processed. Advantageously the forest generator 330 is capable of handling XML nodes from a plurality of namespaces.

Optionally, the forest generator 330 also includes a completion module 390. The completion module 390 identifies a second streaming XML document in the stream of XML documents. For example, in one embodiment, the completion module 390 identifies a second streaming XML document by identifying a close tag a first streaming XML document. In addition, the completion module 390 may discard, delete, or remove the XML pattern forest as a result of identifying the second streaming XML document. In one embodiment, the completion module 390 discard the XML pattern forest by deleting each tree and each twig in the pattern forest. In addition, the completion module 390 may reset a list of identified namespaces such that a new XML pattern forest can be generated for the second streaming XML document.

Figure 4:
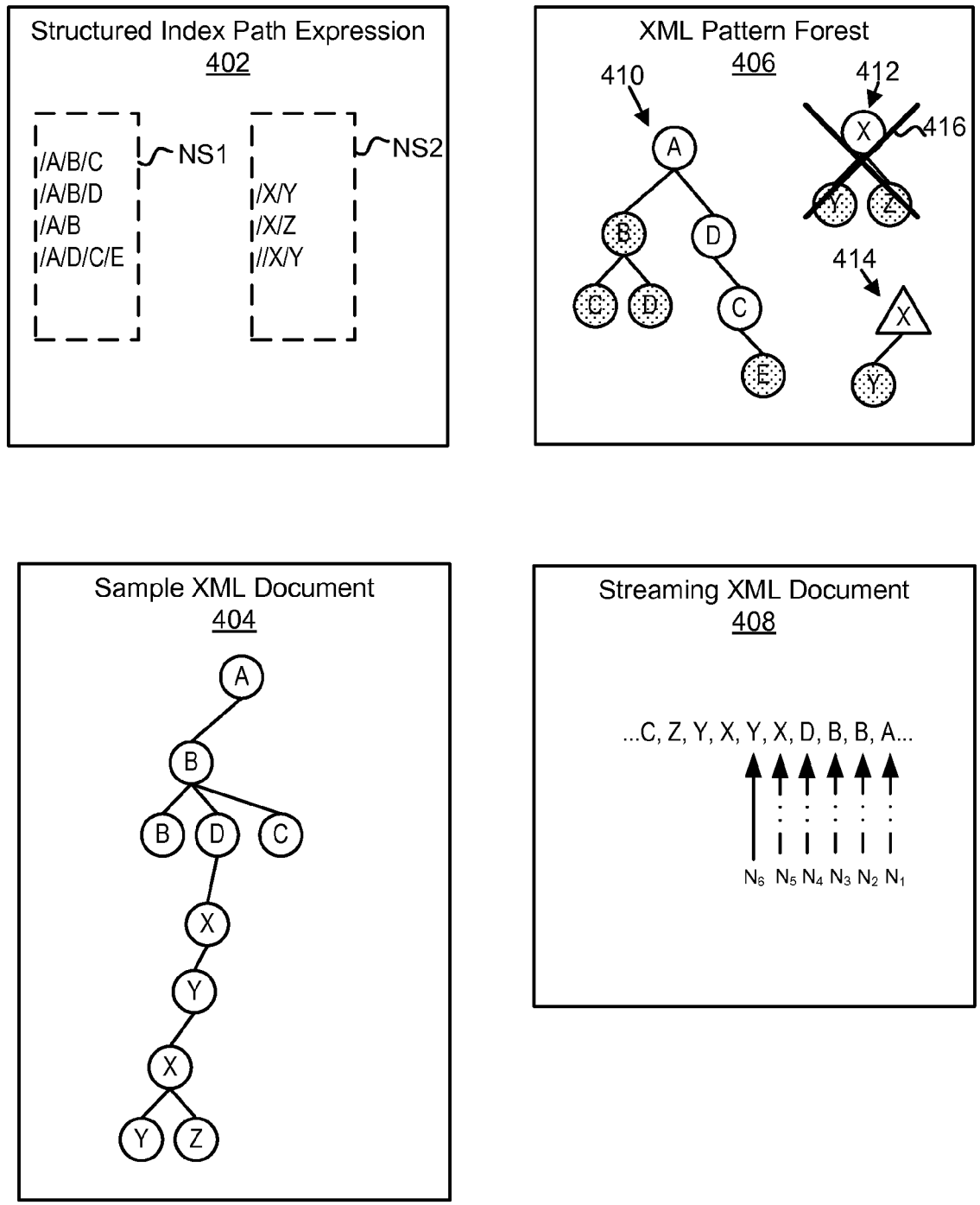
FIG. 4 is a schematic block diagram illustrating exemplary abstract representations of data structures and structured path expressions and a sample XML document processed by one embodiment of an apparatus for efficient content indexing of streaming XML document content in accordance with the present invention.

FIG. 4 illustrates exemplary abstract representations of data structures, a sample set of structured path expressions, and a sample XML document processed by one embodiment of an apparatus for efficient content indexing of streaming XML document content in accordance with the present invention. The apparatus may comprise the apparatus 200 of FIG. 2, the content indexer 110 of FIG. 1, or another embodiment of the present invention.

The example set forth in FIG. 4 includes a collection 402 of sets of structured index path expressions 118, a sample XML document 404 illustrated for discussion purposes, an illustrated representation of an XML pattern forest 406, and an illustrated representation of a streaming XML document 408 that indicates nodes identified during the processing of the sample XML document 404.

The collection 402 includes sets of structured index path expressions 118 includes one or more sets of structured index path expressions 118. Each structured index path expression 118 is defined previously by a client or user. The client or user may be an administrator or other user who has determine an attribute value, node characteristic, node name, or set of nodes relative to an ancestor node or even a set of wild card nodes ("*") that make the associated XML document that includes those nodes of interest for identifying and indexing or cataloging in an index store 114.

A structured index path expression 118 is similar in structure and format to an XML path language (XPATH) expression with certain constraints. First, a structured index path expression 118 includes no predicates in the axis steps that define the structured index path expression 118. Second, axis steps of the structured index path expression 118 include exclusively a node test. Consequently, a structured index path expression as used herein is a series of one or more steps, each step comprising an axis step having a node test and no predicates. In addition, a structured index path expression may start with a descendent or descendent-or-self axis but can then only be followed by a descendent or attribute axis. With the given definition of structured index path expressions 118, a very robust set of expression can be defined in order to identify both nodes and attributes of interest in a given XML document.

Examples of both valid and invalid structured index path expressions 118 include, "/Glossary"—valid, "/Glossary/name"—valid, "/Glossary/*/name"—valid, "/*/*"—valid, "//term/name"—valid, "//term@name"—valid, "/term//name"—invalid, because descendent-or-self axis is only allowed as a first step, "term/name"—invalid, because structured index path expressions may not be relative.

The collection 402 illustrates two sets of structured index path expressions 118. Of course, the collection 402 can include one or more sets, those of skill in the art recognize that two sets are illustrated here for the example. Each set of structured index path expressions 118 is uniquely associated with a namespace represented by a namespace indicator. In the collection 402, the example namespace indicators are "NS1," and "NS2."

The sample XML document 404 includes ten nodes, the root node is A. Suppose the sample XML document 404 has a unique document identifier "http-www.example.com\Sample.xml." Nodes B, D, X, Y, X are descendent nodes and nodes B, Y, Z, and C are leafnodes and descendent nodes. As explained above, the embodiments of the present invention does not read the whole sample XML document 404 into memory as in the DOM model. Instead, the embodiments of the present invention operate on the nodes of the sample XML document 404 as they stream past in a stream of XML documents 408. Examining nodes in the stream of XML documents 408 saves memory as the XML documents streamed may be very large and require significant memory and processing overhead if the XML documents were to be completely represented in memory before being analyzed. Those of skill in the art recognize that certain embodiments of the invention may watch the stream 408 for other types of XML nodes such as text nodes, and/or comment nodes. In the stream of XML documents, the sample XML document 408 is represented with each listed in document order from the root down in the stream reading from right to left.

Operation of one embodiment such as the apparatus 200 of FIG. 2 by way of illustration is now described. Initially, the sets of structured index path expressions 118 are defined and made accessible to the forest generator 230. Next, a scanner 210 streams the sample XML document 404 to generate the streaming XML document 408. The identification module 220 watches the stream 408 for nodes of interest. In this example, the nodes of interest are XML document element nodes and XML document element attribute nodes.

Those of skill in the art will recognize that the sample XML document 404 and thus, the streaming XML document 408 may include nodes that are not of the type XML document element node and/or XML document element attribute node. For example, the sample XML document 404 and corresponding streaming XML document 408 may include text nodes, comment nodes and the like. Examples of such nodes in the sample XML document 404 have not been included for clarity of the example.

Arrow N1 represents the identification by the identification module 220 of XML element node A. In one embodiment, the identification module 220 sends node A to the forest generator 230. The identification module 220 or the forest generator 230 may identify the namespace indicator for node A. Suppose the namespace indicator is "NS1."

The forest generator 230 generates as much of the XML pattern forest 406 as possible based on the structured index path expressions 118 associated with NS1, see collection 402. Here, there are four structured index path expressions 118. Those of skill in the art recognize that any number of structured index path expressions 118 may be associated with a namespace indicator.

The forest generator 230 evaluates each structured index path expression 118 in turn. Evaluation of "/A/B/C" results in the left-most branch of the tree 410. Evaluation of "/A/B/D" results in a grafting into the tree 410 of the left-most D leaf node.

Evaluation of "/A/B" results in the marking of the B node as an index node. An index node is a node of an XML pattern forest tree or twig that has a path from an ancestor node to the index node that matches the axis steps of at least one of the structured index path expressions for the namespace indicator. Evaluation of "/A/D/C/E" results in a grafting into the tree 410 of the right branch D-C-E below the root A. Nodes in the forest 406 that are index nodes are illustrated by the stippled background for the node. In the XML pattern forest 406 nodes B, C, D, E, Y, Z, and Y are each index nodes.

Next, the comparison module 240 compares node A to the nodes of the pattern forest and finds a match at the root of tree 410. However, because root node A is not an index node no match is identified by the determination module 250. The apparatus 200 then waits for the next node of interest to come by in the stream 408.

Next, the identification module 220 sends node B (arrow N2) to the forest generator 230. Suppose node B has the same namespace NS1 and content value of "B is for Boy" and further suppose that nodes A, B, B, D, C of the streaming XML document 408 also are in namespace NS1. The forest generator 230 determines that no adjustments to trees or twigs of the forest 406 are needed.

The comparison module 240 compares node B to the nodes of the pattern forest and the determination module 250 finds a match at the left-most B node of tree 410. Because node B is an index node, the comparison module 240 identifies node B as a match and signals the storage module 260 to store an index entry 122 for node B. The index entry 122 includes an XML document identifier, an XML node name, a namespace indicator, and XML node content. In the example, of FIG. 4, the index entry 122 may be ("http:\\\www.example.com\Sample.xml," "B," "NS1," "B is for Boy"). The apparatus 200 then waits for the next node of interest to come by in the stream 408.

Those of skill in the art will recognize different techniques for the determination module 250 to determine whether an XML node matches one or more of a tree and/or a twig of the XML pattern forest 406. For example, the determination module 250 may maintain a set of hierarchical structures such as software objects that represent the trees and/or twigs of the forest 406. The determination module 250 may manage pointers that indicate which node in each tree and/or twig the last processed XML node of the streaming XML document matched, even if the match did not result in creation of an index entry 122. These pointers may serve as a context in relation to the XML pattern forest 406.

Alternatively, or in addition, rather than maintaining tree objects in memory and associated pointers, the determination module 250 may simply maintain a list of trees and a list of twigs in the forest 406. Each list includes nodes of the forest and each node identifies its child nodes as well as a flag indicating if that node is an index node. The determination module 250 may also maintain a listing of stack of previous partial matches between a XML node of the XML document and a node of a tree or twig, even if the partial match did not result in creation of an index entry 122.

The set of partial matches serves as a context in relation to the XML pattern forest 406. For a subsequent XML node from the XML document, if the determination module 250 determines the subsequent XML node is a child of a member of the partial matches, the determination module 250 has located another partial match that extends further down into a tree or twig of the forest. In addition, if the child of a partial match matches the subsequent XML node and the child nodes is also an index node, then the determination module 250 has found a complete match and an index entry 122 can be generated.

In one embodiment, the determination module 250 operates using partial matches as a context with the understanding that if the context is null the matching operation has not been previously called and that matching should start with the root nodes in the trees list. If the context is not null the determination module 250 recognizes that the context is not null and includes the last set of partial match as a result of a previous call to the determination module 250.

Next, the identification module 220 sends node B (arrow N3) to the forest generator 230 (or signals the forest generator 230 to examine node B). The forest generator 230 makes no changes because the namespace is the same and has been already used to populate the forest 406. The comparison module 240 compares node B to the nodes of the pattern forest 406 and finds no match for /A/B/B. The apparatus 200 then waits for the next node of interest to come by in the stream 408.

Next, the identification module 220 sends node D (arrow N4) to the forest generator 230. The forest generator 230 makes no changes because the namespace is the same and has been already used to populate the forest 406. The comparison module 240 compares node D to the nodes of the pattern forest 406 and finds a match for /A/B/D because the left-most D node is an index node. The comparison module 240 may signal the storage module 260 to store an index entry 122 for node D, such as for example, ("http:\\www.example.com\Sample.xml," "D," "NS1," "D is for Doll"). The apparatus 200 then waits for the next node of interest to come by in the stream 408.

Next, the identification module 220 sends node X (arrow N5) to the forest generator 230. Suppose that nodes X, Y, X, Y, and Z of the XML document 404 are each for namespace "NS2." In one embodiment, the comparison module 240 of the apparatus 200 determines that the namespace of node X is different from the previously identified namespace "NS1." Consequently, the comparison module 240 may signal or otherwise case the forest generator 230 to reference, read, load, and/or retrieve a second set of structured index path expressions 118. As illustrated in this example, the second set of structured index path expressions 118 may comprise all those expressions associated with namespace "NS2" including /X/Y, /X/Z, and //X/Y. Next, the forest generator 230 may modify the XML pattern forest 406 to include at least one of a tree and a twig that represents each structured index path expressions 118 in the second set of structured index path expressions 118.

In this example, this means that the forest generator 230 may generate the new tree rooted at X node having descendent nodes Y and Z that are index nodes. In addition, the forest generator 230 may generate a twig data structure comprising X as the top node with the descendent index node Y. It should be noted that the relative descendent-or-self structured index path expression 118 "//X/Y" is not rooted in the X node. The triangle indicates that this is a twig representing a relative structured index path expressions 118.

In one embodiment, the tree generator 370 generates the new tree 412 and the twig generator 360 generates the new twig 414. In certain embodiments, or in addition, the forest generator 330 may execute the skip module 350 which prevents the generation of the new tree 412 because the skip module 350 may recognize that the root node of the XML document is A and has already been identified and thus no descendent nodes of the XML document can have X as a root node. Alternatively, the comparison module 340 may execute the pruning module 310 which removes 416 the tree 412 for these same reasons. In contrast, the twig 414 is not removed because node X—in the triangle, is not a root node and thus can match in the XML document on later encountered descendent nodes.

The comparison module 240 compares node X to the nodes of the pattern forest 406 and finds a match in the twig 414 for node X but node X is not an index match. The apparatus 200 then waits for the next node of interest to come by in the stream 408.

Next, the identification module 220 sends node Y (arrow N5) to the forest generator 230. The forest generator 230 makes no changes because the namespace is the same and has been already used to populate/modify the forest 406. The comparison module 240 compares node Y to the nodes of the pattern forest 406 and finds a match for //X/Y in the twig 414 because the Y node is an index node. The comparison module 240 may signal the storage module 260 to store an index entry 122 for node Y, such as for example, ("http:\\www.example.com\Sample.xml" "Y," "NS2," "Y is for Yack"). The apparatus 200 then waits for the next node of interest to come by in the stream 408. This process repeats until the completion module 390 determines that a second streaming XML document is next to arrive in the XML document stream 120. The completion module 390 may identify a second streaming XML document by identifying the last node of the current streaming XML document 408. Alternatively, or in addition, the completion module 390 may identify a second streaming XML document by identifying the first node of the a second streaming XML document.

Figure 5:
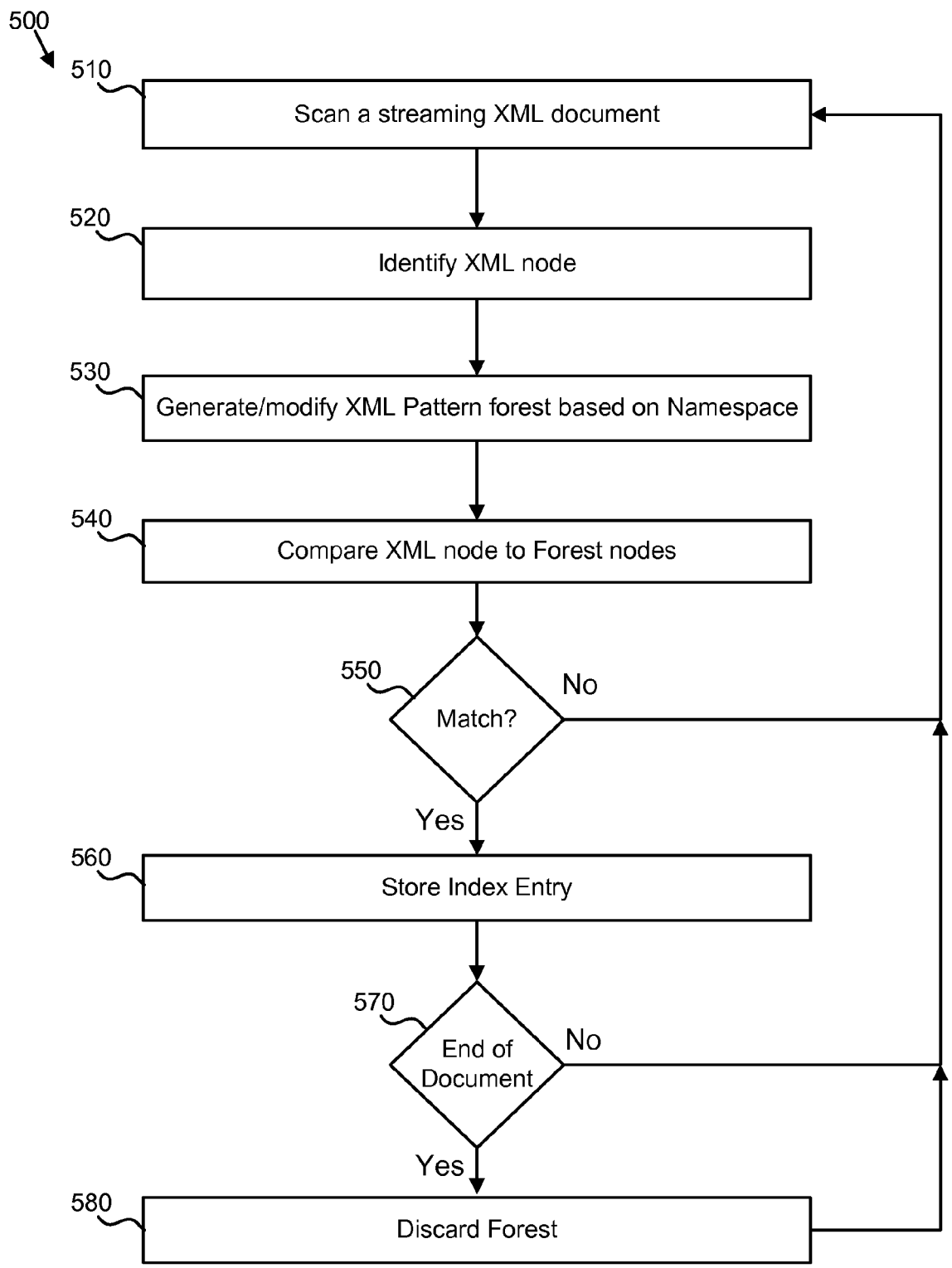
FIG. 5 is a schematic flow chart diagram illustrating one embodiment of a method for efficient content indexing of streaming XML document content in accordance with the present invention.

FIG. 5 is a schematic flow chart diagram illustrating one embodiment of a method 500 for efficient content indexing of streaming XML document content. The method 500 begins. The scanner 210 scans 510 a streaming XML document 408 in a stream of XML documents 120. In one embodiment, the streaming XML document 408 is streamed in document order according to XML tree traversal protocol. Next, the identification module 220 identifies 520 an XML node of the streaming XML document 408 in the stream 120. In one embodiment, the identification module 220 watches exclusively for XML document element nodes and/or XML document element attribute nodes.

Next, the forest generator 230 generate or modifies 530 an XML pattern forest 406 based on a set of structured index path expressions 118. The XML pattern forest 406 includes one or more trees 410 or one or more twigs 414 generated from a set of structured index path expressions 118 uniquely associated with a namespace indicator for the XML node. With certain iterations, the pruning module 310, skip module 350, twig generator 360, tree generator 370, and/or grafting module 380 may modify the XML pattern forest 406 for efficiency and to accurately represent the structured index path expressions 118 referenced by different namespace indicators.

Next, the comparison module 240 compares 540 the XML node to nodes of the XML pattern forest 406. Preferably, the comparison module 240 searches nodes in each tree and in each twig of the forest 406. In one embodiment, the comparison module 240 may determine that the namespace indicator is different from a previously identified namespace indicator and cause the forest generator 230 to reference a second set of structured index path expressions, the second set of structured index path expressions identified by way of the namespace indicator, the forest generator 230 may further modify the XML pattern forest to include at least one of a tree and a twig representative of the second set of structured index path expressions and the set of structured index path expressions.

The determination module 250 determines 550 if there is a match between the XML node and an index node in one of the trees and/or twigs of the XML pattern forest 406. If not, the method 500 returns to scanning 510 the streaming XML document. If there is a match, the storage module 260 stores 560 an index entry 122 representative of the XML node.

The completion module 390 determines 570 if the end of the streaming XML document has been reached and/or whether a second streaming XML document is now present in the stream 120. If not, the method 500 returns to scanning 510 the streaming XML document. If so, the completion module 390 may discard 580 or delete 580 the members of the XML pattern forest 406. Then the method 500 returns to scanning 510 a subsequent streaming XML document.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for content indexing of streaming hierarchical document content, the method comprising:
   identifying a hierarchical node from a streaming hierarchical document, the streaming hierarchical document streamed in document order from an stored intact hierarchical document, the streaming hierarchical document comprising two or more namespace indicators, the hierarchical node associated with a first namespace indicator of the two or more namespace indicators;
   generating a first portion of a hierarchical pattern forest for the first namespace indicator using a first set of structured index path expressions, the hierarchical pattern forest comprising at least one of a tree and a twig generated from one or more structured index path expressions of the first set of structured index path expressions;
   comparing the hierarchical node to nodes of the first portion of the hierarchical pattern forest;
   matching the hierarchical node with an index node in one of a tree and a twig of the first portion of the hierarchical pattern forest, the index node having a path from an ancestor node to the index node that matches axis steps of at least one of the structured index path expressions for the first namespace indicator;
   storing an index entry for the hierarchical node in response to the determined match;
   identifying a second hierarchical node associated with a second namespace indicator; and
   generating a second portion of the hierarchical pattern forest for the second namespace indicator using a second set of structured index path expressions.

2. The method of claim 1, wherein each twig represents a structured index path expression that has a descendent-or-self axis for a first step.

3. The method of claim 1, wherein generating the first portion of the hierarchical pattern forest further comprises,
   reading the first set of structured index path expressions from a repository, the first set of structured index path expressions identified by way of the first namespace indicator;
   ignoring each index path expression having no descendent axis steps;
   ignoring each index path expression having a first axis step that is different from a root node of the streaming hierarchical document;
   defining a new twig for each index path expression having a descendent-or-self axis for a first step, the new twig comprising nodes representing the index path expression;
   defining a new tree for each index path expression having a first axis step different from a root of an existing tree in the hierarchical pattern forest, the new tree comprising nodes representing the index path expression; and
   identifying an existing tree in the forest having a root node matching the first axis step of an index path expression and appending a branch of nodes to the existing tree, the branch of nodes corresponding to one or more axis steps of the index path expression that differ from nodes of the existing tree, the branch anchored at a node that matches a last matching axis step of the index path expression evaluated from left to right.

4. The method of claim 1, further comprising,
   determining that the second namespace indicator is different from a previously identified namespace indicator; referencing the second set of structured index path expressions, the second set of structured index path expressions identified by way of the second namespace indicator; and
   modifying the hierarchical pattern forest to include at least one of a tree and a twig representative of the second set of structured index path expressions and the set of structured index path expressions.

5. The method of claim 1, further comprising,
   determining that the hierarchical node is a root node for the streaming hierarchical document; and
   removing one or more trees from the hierarchical pattern forest having a root node that does not match the hierarchical node.

6. The method of claim 1, further comprising,
   identifying a last node of the streaming hierarchical document; and
   discarding the hierarchical pattern forest in response to identifying the last node of the streaming hierarchical document.

7. The method of claim 1, wherein the first set of structured index path expressions is uniquely associated with the first namespace indicator and wherein each structured index path expression comprises a series of one or more steps, each step comprising an axis step and each step having a node test and no predicates.

8. A computer program product comprising a non-transitory computer readable storage medium having computer usable program code executable to perform operations for content indexing of streaming Extensible Markup Language (XML) document content, the computer program product comprising:
   a scanner configured to scan a streaming XML document in a stream of XML documents, the streaming XML document streamed in document order from a stored intact hierarchical document according to XML tree traversal protocol;
   an identification module configured to identify an XML node of the streaming XML document, the XML node comprising one of an XML document element node and an XML document element attribute node, the streaming XML document comprising two or more namespace indicators, the XML node associated with a first namespace indicator of the two or more namespace indicators;
   a forest generator configured to generate a first portion of a XML pattern forest for the first namespace indicator using a first set of structured index path expressions, the XML pattern forest comprising at least one of a tree and a twig generated from at least a portion of one or more structured index path expressions of the first set of structured index path expressions;
   a comparison module configured to compare the XML node to nodes of the first portion of the XML pattern forest;
   a determination module configured to determine a match between the XML node and an index node in one of a tree and a twig of the first portion of the XML pattern forest, the index node having a path from an ancestor node to the index node that matches the axis steps of at least one of the structured index path expressions for the first namespace indicator; and
   a storage module configured to store an index entry for the XML node in response to the determined match,
   the identification module further configured to identify a second XML node associated with a second namespace indicator; and the forest generator further configured to generate a second portion of the XML pattern forest for the second namespace indicator using a second set of structured index path expressions.

9. The computer program product of claim 8, wherein the forest generator comprises,
a read module configured to read the first set of structured index path expressions from a repository, the first set of structured index path expressions identified by way of the first namespace indicator;
a skip module configured to ignore each index path expression having no descendent axis steps, and to ignore each index path expression having a first axis step that is different from a root node of the streaming XML document;
a twig generator configured to define a new twig for each index path expression having a descendent-or-self axis for a first step, the new twig comprising nodes representing the index path expression;
a tree generator configured to define a new tree for each index path expression having a first axis step different from a root of an existing tree in the XML pattern forest, the new tree comprising nodes representing the index path expression; and
a grafting module configured to identify an existing tree in the forest having a root node matching the first axis step of an index path expression and appending a branch of nodes to the existing tree, the branch of nodes corresponding to one or more axis steps of the index path expression that differ from nodes of the existing tree, the branch anchored at a node that matches a last matching axis step of the index path expression evaluated from left to right.

10. The computer program product of claim 8, wherein the comparison module is configured to determine that the second namespace indicator is different from a previously identified namespace indicator and cause the forest generator to reference the second set of structured index path expressions, the second set of structured index path expressions identified by way of the second namespace indicator, the forest generator further configured to modify the XML pattern forest to include at least one of a tree and a twig representative of the second set of structured index path expressions and the first set of structured index path expressions.

11. The computer program product of claim 8, wherein the comparison module comprises a pruning module configured to determine that the XML node is a root node for the streaming XML document, and remove one or more trees from the XML pattern forest having a root node that does not match the XML node.

12. The computer program product of claim 8, wherein the forest generator comprises a completion module configured to identify a second streaming XML document in the stream of XML documents, and discard the XML pattern forest in response to identifying the second streaming XML document.

13. The computer program product of claim 8, wherein the first set of structured index path expressions is uniquely associated with the first namespace indicator and wherein each structured index path expression comprises a series of one or more steps, each step comprising an axis step and each step having a node test and no predicates.

14. A system for content indexing of streaming Extensible Markup Language (XML) document content, the system comprising:
a storage services module executed by a processor within a computer readable storage medium, the storage services module configured to store documents in a storage repository and to retrieve documents from the storage repository in response to XML document requests;
a storage engine in communication with the storage services module, the storage engine configured to store XML documents in the storage repository intact and to generate a stream of XML documents, the stream of XML documents comprising new XML documents that are added to the storage repository and updates to existing XML documents stored in the storage repository;
a document indexer configured to receive the stream of XML documents and direct the stream of XML documents to a content indexer comprising,
a scanner configured to scan a streaming XML document in a stream of XML documents, the streaming XML document streamed in document order according to XML tree traversal protocol;
an identification module configured to identify an XML node of the streaming XML document, the XML node comprising one of an XML document element node and an XML document element attribute node, the streaming XML document comprising two or more namespace indicators, the XML node associated with a first namespace indicator of the two or more namespace indicators;
a forest generator configured to generate a first portion of a XML pattern forest for the first namespace indicator using a first set of structured index path expressions retrieved from an index path expression repository, the XML pattern forest comprising at least one of a tree and a twig generated from one or more structured index path expressions of the first set of structured index path expressions;
a comparison module configured to compare the XML node to nodes of the first portion of the XML pattern forest;
a determination module configured to determine a match between the XML node and an index node in one of a tree and a twig of the first portion of the XML pattern forest, the index node having a path from an ancestor node to the index node that matches the axis steps of at least one of the structured index path expressions for the first namespace indicator; and
a storage module configured to store an index entry for the XML node in an index store in response to the determined match;
the identification module further configured to identify a second XML node associated with a second namespace indicator; and
the forest generator further configured to generate a second portion of the XML pattern forest for the second namespace indicator using a second set of structured index path expressions; and
a query services module configured to receive index queries for XML documents containing content satisfying an index query and configured to return index entries that satisfy the index query.

15. The system of claim 14, wherein the forest generator comprises,
a read module configured to read the first set of structured index path expressions from a repository, the first set of structured index path expressions identified by way of the first namespace indicator;
a skip module configured to ignore each index path expression having no descendent axis steps, and to ignore each index path expression having a first axis step that is different from a root node of the streaming XML document;

a twig generator configured to define a new twig for each index path expression having a descendent-or-self axis for a first step, the new twig comprising nodes representing the index path expression;

a tree generator configured to define a new tree for each index path expression having a first axis step different from a root of an existing tree in the XML pattern forest, the new tree comprising nodes representing the index path expression; and a grafting module configured to identify an existing tree in the forest having a root node matching the first axis step of an index path expression and appending a branch of nodes to the existing tree, the branch of nodes corresponding to one or more axis steps of the index path expression that differ from nodes of the existing tree, the branch anchored at a node that matches a last matching axis step of the index path expression evaluated from left to right.

16. The system of claim 14, wherein the comparison module is configured to determine that the second namespace indicator is different from a previously identified namespace indicator and cause the forest generator to reference the second set of structured index path expressions, the second set of structured index path expressions identified by way of the second namespace indicator, the forest generator further configured to modify the XML pattern forest to include at least one of a tree and a twig representative of the second set of structured index path expressions and the first set of structured index path expressions.

17. The system of claim 14, wherein the comparison module comprises a pruning module configured to determine that the XML node is a root node for the streaming XML document, and remove one or more trees from the XML pattern forest having a root node that does not match the XML node.

18. The system of claim 14, wherein the forest generator comprises a completion module configured to identify a second streaming XML document in the stream of XML documents, and discard the XML pattern forest in response to identifying the second streaming XML document.

19. The system of claim 14, wherein the first set of structured index path expressions is uniquely associated with the first namespace indicator and wherein each structured index path expression comprises a series of one or more steps, each step comprising an axis step and each step having a node test and no predicates.

20. A computer program product comprising a non-transitory computer readable storage medium having computer usable program code executable to perform operations for content indexing of streaming Extensible Markup Language (XML) document content, the computer program product comprising:

a scanner configured to scan a streaming XML document in a stream of XML documents, the streaming XML document streamed in document order according to XML tree traversal protocol from a stored intact hierarchical document;

an identification module configured to identify an XML node of the streaming XML document, the XML node comprising one of an XML document element node and an XML document element attribute node, the streaming XML document comprising one two or more namespace indicators, the XML node associated with a particular namespace indicator of the one two or more namespace indicators;

a forest generator configured to generate a first portion of a XML pattern forest for the first namespace indicator using a first set of structured index path expressions, the XML pattern forest comprising at least one of a tree and a twig generated from at least a portion of one or more structured index path expressions of the first set of structured index path expressions, read module configured to read the first set of structured index path expressions from a repository, the first set of structured index path expressions identified by way of the first namespace indicator;

skip module configured to ignore each index path expression having no descendent axis steps, and to ignore each index path expression having a first axis step that is different from a root node of the streaming XML document;

twig generator configured to define a new twig for each index path expression having a descendent-or-self axis for a first step, the new twig comprising nodes representing the index path expression;

a comparison module configured to compare the XML node to nodes of the first portion of the XML pattern forest;

a determination module configured to determine a match between the XML node and an index node in one of a tree and a twig of the first portion of the XML pattern forest;

a storage module configured to store an index entry for the XML node in response to the determined match, the comparison module configured to compare a second XML node to nodes of the XML pattern forest and configured to determine that a second namespace indicator of the second XML node is different from a previously identified namespace indicator and cause the forest generator to reference a second set of structured index path expressions, the second set of structured index path expressions identified by way of the second namespace indicator, the forest generator further configured to generate a second portion of the hierarchical pattern forest for the second namespace indicator using a second set of structured index path expressions and modify the XML pattern forest to include at least one of a tree and a twig representative of the second set of structured index path expressions and the set of structured index path expressions;

the determination module configured to determine a match between the XML node and an index node in one of a tree and a twig of the XML pattern forest, the index node having a path from an ancestor node to the index node that matches the axis steps of at least one of the structured index path expressions of the particular namespace indicator; and the storage module configured to store an index entry for the XML node in response to the determined match.

* * * * *